United States Patent
Movsisyan et al.

(10) Patent No.: US 10,725,810 B2
(45) Date of Patent: Jul. 28, 2020

(54) MIGRATING VIRTUALIZED COMPUTING INSTANCES THAT IMPLEMENT A LOGICAL MULTI-NODE APPLICATION

(71) Applicant: VMWARE, INC., Palo Alto, CA (US)

(72) Inventors: Vardan Movsisyan, Yerevan (AM); Anna Grigoryan, Yerevan (AM); Gagik Manukyan, Yerevan (AM)

(73) Assignee: VMWARE, INC., Palo Alto, CA (US)

( * ) Notice: Subject to any disclaimer, the term of this patent is extended or adjusted under 35 U.S.C. 154(b) by 103 days.

(21) Appl. No.: 15/610,656

(22) Filed: Jun. 1, 2017

(65) Prior Publication Data

US 2018/0349166 A1  Dec. 6, 2018

(51) Int. Cl.
G06F 9/46 (2006.01)
G06F 9/455 (2018.01)
G06F 9/50 (2006.01)

(52) U.S. Cl.
CPC ........ *G06F 9/45558* (2013.01); *G06F 9/5088* (2013.01); *G06F 2009/4557* (2013.01)

(58) Field of Classification Search
CPC . G06F 9/5077; G06F 8/30; G06F 8/60; G06F 9/45504; G06F 9/45558; G06F 9/5088
See application file for complete search history.

(56) References Cited

U.S. PATENT DOCUMENTS

| | | | | |
|---|---|---|---|---|
| 7,194,723 B1* | 3/2007 | Hwang | ............... | G06F 17/5054 716/117 |
| 9,250,863 B1* | 2/2016 | Vincent | ............... | G06F 9/45558 |
| 9,350,682 B1* | 5/2016 | Gupta | ................. | G06F 9/45558 |
| 9,684,369 B2* | 6/2017 | Huang | ................. | G06F 3/011 |
| 9,727,363 B2* | 8/2017 | Wang | .................... | G06F 9/4856 |
| 2004/0133776 A1* | 7/2004 | Putzolu | ................ | G06F 9/4868 713/153 |
| 2009/0313311 A1 | 12/2009 | Hoffmann et al. | | |
| 2014/0222745 A1 | 8/2014 | Deng et al. | | |
| 2015/0128052 A1* | 5/2015 | Grehan | ................. | G06F 1/3203 715/735 |

(Continued)

OTHER PUBLICATIONS

"Create a Service Blueprint", Retrieved on Sep. 29, 2016. pp. 2.

(Continued)

*Primary Examiner* — Camquy Truong
(74) *Attorney, Agent, or Firm* — Su IP Consulting

(57) ABSTRACT

Some embodiments of the invention provide a novel method of migrating virtualized computing instances (VCIs) that implement a multi-node application. The method may identify a plurality of VCIs that implement a multi-node application, each of the plurality of VCIs being executed on a respective source host, and may identify a role performed by each VCI of the identified plurality of VCIs. The method may also generate a plurality of batches, each batch of the plurality of batches including a set of the identified plurality of VCIs selected based on the identified role of each of the VCIs, and generate a migration sequence comprising an ordered sequence of the plurality of batches. The method may migrate the identified plurality of VCIs from its respective source host to a respective destination host according to the migration sequence.

17 Claims, 7 Drawing Sheets

(56) References Cited

U.S. PATENT DOCUMENTS

| | | | |
|---|---|---|---|
| 2016/0092252 A1* | 3/2016 | Wagner | G06F 9/45533 718/1 |
| 2016/0103699 A1 | 4/2016 | Thakkar et al. | |
| 2016/0246636 A1* | 8/2016 | Tsirkin | G06F 9/45558 |
| 2016/0277299 A1 | 9/2016 | Kadaba et al. | |
| 2017/0185563 A1 | 6/2017 | Underwood et al. | |

OTHER PUBLICATIONS

"VMware vRealize Log Insight—Automated Log Management for Hybrid Cloud Environments", Datasheet, pp. 2.

"VMware vRealize Operations—Intelligent Operations from Applications to Storage—from vSphere and Hyper-V to Amazon Web Service and Physical Hardware", Datasheet, Retrieved on Nov. 27, 2018 from <URL:https://www.vmware.com/content/dam/digitalmarketing/vmware/en/pdf/products/vcenter/vmware-vrealize-operations-datasheet.pdf>, pp. 2.

"VMware vRealize Network Insight", Intelligent operations for networking and security for physical, virtual and cloud environments, pp. 2.

* cited by examiner

MIGRATING VIRTUALIZED COMPUTING INSTANCES THAT IMPLEMENT A LOGICAL MULTI-NODE APPLICATION

BACKGROUND

Logical multi-node applications are implemented using two or more network nodes/hosts and can provide a wide variety of services, such as different web applications, back office, document management, communications, etc. Logical applications can range from simple websites that use only a few nodes/hosts to more complex structures in terms of both scale and depth, which can use hundreds of thousands of different nodes/hosts.

Migration is the task of moving a virtual computing instance (VCI) from one physical hardware environment to another. Migration between different clouds or environments, or even smaller-scale migration within a datacentre, of VCIs that implement a logical multi-node applications can pose challenges, such as downtime. For example, an application comprising an email system may require at least one VCI that performs a database server role to be ready before a VCI performing a web server role starts to request data from it. If a web server role VCI attempts to request the data whilst the database server role VCIs are unavailable due to being migrated then this will result in errors, or at least degrade performance.

SUMMARY

In one example there is provided a computer-implemented method of migrating virtualized computing instances (VCIs) that implement a logical multi-node application, the method comprising:

identifying a plurality of VCIs that implement a logical multi-node application, each of the plurality of VCIs being executed on a respective source host;

identifying a role performed by each VCI of the identified plurality of VCIs;

generating a plurality of batches, each batch of the plurality of batches including a set of the identified plurality of VCIs selected based on the identified role of each of the VCIs;

generating a migration sequence comprising an ordered sequence of the plurality of batches, and migrating the identified plurality of VCIs from its respective source host to a respective destination host according to the migration sequence.

In some embodiments the step of generating the plurality of batches may comprise selecting the set of identified VCIs included in each batch of the plurality of batches based on a migration goal intended to prevent outage of the logical multi-node application during the migrating of the identified plurality of VCIs.

In some embodiments the selecting the set of identified VCIs included in each batch of the plurality of batches may comprise: selecting a first role from amongst the roles performed by the plurality of VCIs that is to be started first on a destination host during the migrating of the identified plurality of VCIs, and including at least one of the identified VCIs that performs the first role in a first batch of the migration sequence.

In some embodiments the first role may comprise: a role amongst the roles performed by the plurality of VCIs that is a destination of most connections between the roles of the logical multi-node application, or a role amongst the roles performed by the plurality of VCIs found to cause a majority of errors within the logical multi-node application, or a role amongst the roles performed by the plurality of VCIs that is slowest to become fully operational after being started, or a role amongst the roles performed by the plurality of VCIs that is relatively large in size, or a role amongst the roles performed by the plurality of VCIs that has relatively high processor and/or memory usage.

In some embodiments the selecting the set of identified VCIs included in each batch of the plurality of batches may comprise: selecting a last role from amongst the roles performed by the plurality of VCIs that is to be started last on a destination host during the migrating of the identified plurality of VCIs, and including at least one of the identified VCIs that performs the last role in a last batch of the migration sequence.

In some embodiments the last role may comprise: a role amongst the roles performed by the plurality of VCIs that functions as an input-point for the logical multi-node application, or a role amongst the roles performed by the plurality of VCIs where processing of a user or client request terminates, or a role amongst the roles performed by the plurality of VCIs that functions as a source of a greatest number of connections between the roles of the logical multi-node application, or a role amongst the roles performed by the plurality of VCIs found to cause a minority of errors within the logical multi-node application, a role amongst the roles performed by the plurality of VCIs that is fastest to become fully operational after being migrated, or a role amongst the roles performed by the plurality of VCIs that is relatively small in size, or a role amongst the roles performed by the plurality of VCIs that has relatively low processor and/or memory usage.

In some embodiments the selecting the set of identified VCIs included in the first batch of the plurality of batches may comprise selecting at least one identified VCI that performs each of the roles of the logical multi-node application.

In some embodiments the selecting the set of identified VCIs included in the first batch of the plurality of batches may comprise: selecting a number of VCIs that perform each of the roles of the logical multi-node application for inclusion in at least one batch of the plurality of batches, wherein the selected number corresponds proportionally to a total number of the VCIs that perform each of the roles in the logical multi-node application.

In some embodiments the step of generating the plurality of batches may comprise selecting the set of identified VCIs included in each batch of the plurality of batches based on a migration goal intended to migrate one or more of the identified plurality of VCIs from its respective source host to a respective destination host that has a relatively lower running cost.

In some embodiments the method may further comprise: generating an updated plurality of batches, each batch of the updated plurality of batches including a set of the identified plurality of VCIs not yet migrated to the respective destination host selected based on the identified role of each of the VCIs; generating an updated migration sequence comprising an ordered sequence of the updated plurality of batches, and migrating each of the identified plurality of VCIs not yet migrated to the respective destination host from its respective source host to its respective destination host according to the updated migration sequence.

In some embodiments the step of generating the updated plurality of batches may be performed in response to a detected change in an environment or network including the source host and/or the destination host that executes at least one VCI of the identified plurality of VCIs. The detected change may comprise: a change in bandwidth capacity between one or more of the source host and the destination host, or a change in usage intensity of a processor of the source host, or a change in a running cost of the source host and/or the destination host, or a change in a cost associated with the migrating of the identified plurality of VCIs.

In some embodiments the step of generating the updated plurality of batches may comprise increasing or decreasing a number of VCIs being executed on the processor experiencing the change in usage intensity included in at least a current batch of the updated plurality of batches.

In some embodiments the method may further comprise: determining whether the VCIs migrated to the respective destination hosts are sufficient to allow safe execution of the logical multi-node application using at least some of the VCIs migrated to the respective destination hosts, and starting the VCIs migrated to the respective destination hosts based on the determination.

In some embodiments the method may further comprise diverting traffic destined for the at least some VCIs started on the respective destination hosts from the respective source hosts to the respective destination hosts. The method may further comprise starting, on the respective destination hosts, at least some others of the VCIs migrated to the respective destination hosts after the at least some VCIs have been started on the destination hosts.

In some embodiments the method may further comprise stopping the migrating of one of the identified plurality of VCIs from its respective source host to its respective destination host when another VCI of the identified plurality of VCIs that performs a same role was previously migrated from the respective destination host due to a failure condition.

In some embodiments the method may further comprise migrating, to the destination host, data associated with one of the VCIs migrated to the destination host, wherein the data has been changed at the respective source host during the migration of the VCI to the respective destination host.

In one example there is provided a non-transitory machine readable medium storing a program which when executed by at least one processing unit migrates virtualized computing instances (VCIs) that implement a logical multi-node application, the program comprising sets of instructions for:

identifying a plurality of VCIs that implement a logical multi-node application, each of the plurality of VCIs being executed on a respective source host;

identifying a role performed by each VCI of the identified plurality of VCIs;

generating a plurality of batches, each batch of the plurality of batches including a set of the identified plurality of VCIs selected based on the identified role of each of the VCIs;

generating a migration sequence comprising an ordered sequence of the plurality of batches, and migrating the identified plurality of VCIs from its respective source host to a respective destination host according to the migration sequence.

In another example there is provided a system configured to migrate virtualized computing instances (VCIs) that implement a logical multi-node application, the system comprising one or more processing units executing sets of instructions for:

identifying a plurality of VCIs that implement a logical multi-node application, each of the plurality of VCIs being executed on a respective source host;

identifying a role performed by each VCI of the identified plurality of VCIs;

generating a plurality of batches, each batch of the plurality of batches including a set of the identified plurality of VCIs selected based on the identified role of each of the VCIs; generating a migration sequence comprising an ordered sequence of the plurality of batches, and migrating the identified plurality of VCIs from its respective source host to a respective destination host according to the migration sequence.

In one example there is provided a computer-implemented method according to claim 1 appended hereto.

According to the present invention there is provided a non-transitory machine readable medium according to the claims appended hereto.

According to the present invention there is provided a system according to the claims appended hereto.

Additional features will be appreciated from the dependent claims and the discussion herein The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it should be understood that the invention is not limited to the embodiments set forth and that the invention may be practiced without some of the specific details and examples discussed.

Figure 1:
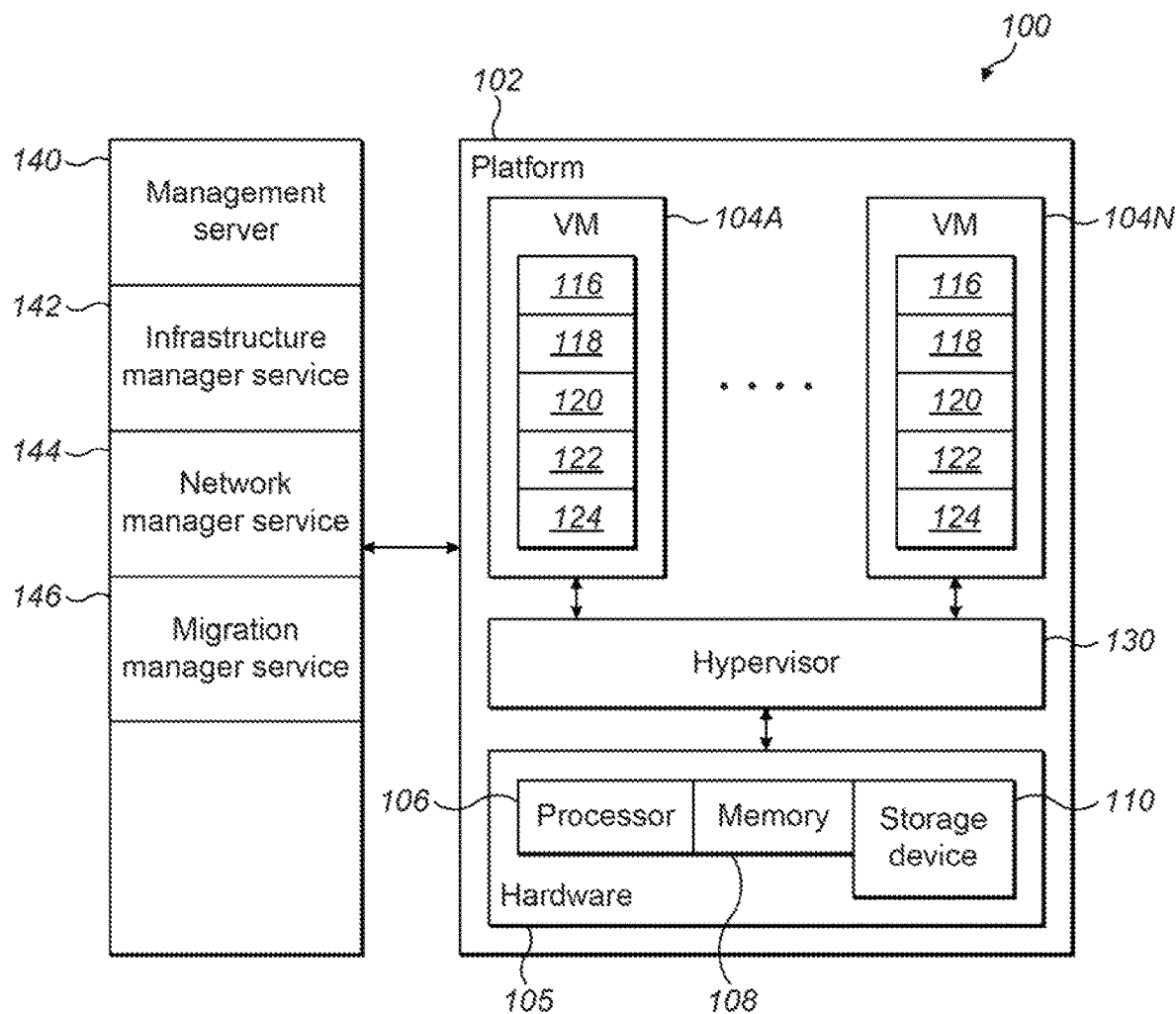
FIG. 1 is a block diagram illustrating components of a virtualization infrastructure that can execute an example embodiment.

FIG. 1 is a schematic block diagram illustrating components of an example embodiment. The example embodiment of FIG. 1 is based on a virtualization infrastructure 100 configured to support virtual machines (VMs). The various computational and administrative modules shown in FIG. 1 can comprise computer-executable instructions that may be provided, stored, loaded and executed from any known computer-readable storage medium, including downloading the code over a network into memory or other storage units, on physical media such as CD-ROM or other disks, on optical or magnetic storage media, on flash or other RAM-based memory devices, etc. It will be understood that alternative embodiments can be based on non-virtualized environments.

As generally understood in the field of data center administration, a VM is a software abstraction of a physical computer system. In some embodiments the virtualization infrastructure 100 can include at least one host hardware platform 102 that supports a set of nodes/hosts 104A-104N that are configured as network objects in the form of VMs 104A-104N with supporting and supervisory hardware and software modules. Although FIG. 1 shows VMs, it should be understood that a VM running on a host is merely one example of a "virtualized computing instance" (VCI) or "workload." A VCI may represent an addressable data compute node or isolated user space instance. In practice, any suitable technology may be used to provide isolated user space instances, not just hardware virtualization. Other VCIs may include containers (e.g., running on top of a host operating system without the need for a hypervisor or separate operating system; or implemented as an operating system level virtualization), virtual private servers, etc. The virtual machines may also be complete computational environments, containing virtual equivalents of the hardware and software components of a physical computing system.

In the example embodiment of FIG. 1 the host platform comprises hardware 105 that typically includes at least one processor 106, internal memory 108 and storage device 110, such as a disk. Each of the VMs/VCIs 104 will typically include at least one virtual processor 116, virtual system memory 118, a virtual disk 120 and a guest operating system 122. Executable files will be accessed by the guest OS from the virtual disk or virtual memory.

Applications 124, which can provide services of a logical multi-node application, running within the VMs/VCIs 104 will act essentially the same as they would if run directly on a physical computer. As an example only, the logical multi-node application implemented by the VMs/VCIs 104 may comprise a database system. In this case, some of the applications 124 can configure some of the VMs/VCIs to perform web server roles that are responsible for processing requests from web clients running on respective user devices, such as Hypertext Transfer Protocol (HTTP) requests to access web content, etc. Others of the applications 124 can configure other VMs/VCIs to perform database server roles that are responsible for providing database services to the web servers to query.

In general, each of the VMs/VCIs 104 can be considered as performing a role of the logical multi-node application. The term "role" may refer generally to a set of functionalities performed by a VCI in the context of the logical multi-node application. Typical examples of roles include: specific application server, web-server, database-server, email-server, caching/proxy server, DNS (Domain Name System) server, combination of such services, etc. It should also be noted that in some cases at least one VM/VCI on at least one other hardware platform (not shown) of the infrastructure can implement at least one role of the logical multi-node application.

Virtualization software including a hypervisor 130 can provide an interface between each of the VMs/VCIs 104 and the underlying host platform hardware 105. The infrastructure 100 can further include management server 140, such as VMware vCenter Server, that functions as a centralized initiating and supervisory system for provisioning and managing the overall virtual infrastructure.

Some embodiments can include an infrastructure manager service 142 configured to provide resource/inventory information regarding the VMs/VCIs 104. In some embodiments the infrastructure manager service may comprise a data center management server application that can provide centralized management and operation, resource provisioning and performance evaluation of virtual machines. An example of the infrastructure manager service 142 can comprise at least one (virtual or non-virtual) computing device, or possibly a software application or module running on the management server 140.

Some embodiments can include a network manager service 144. This can provide information regarding network usage and traffic in relation to at least some of the VMs/VCIs 104. An example of the network manager service 144 for a virtualized network can comprise at least one (virtual or non-virtual) computing device executing NSX by VMware. NSX is a Software Defined Networking (SDN) system that abstracts network operations from the underlying hardware onto a distributed virtualization layer. SDN systems can provide logical network isolation between logically defined networks on which the nodes 104 reside, and implement distributed logical firewalls, switches, routers, ports and other networking elements. It can also support external networking and security ecosystem services.

Some embodiments can include a migration manager service 146, which may be a component of the infrastructure manager service 142. The migration manager can be configured to migrate VCIs that implement roles of the logical multi-node application from at least one host. e.g. the host 102, to at least one other host. The various hosts may have different hardware and/or software configurations. The migration manager can use any suitable known migration technique, typically live migration, and can determine the destination host(s) to which the VCI is to be migrated based on various criteria (e.g. hardware suitability of destination, connectivity between source and host, current processor/storage availability of the destination), and may be defined by a user/administrator and/or in an automated manner. In live migration techniques, the application which the VCIs implement can continue to run uninterrupted during migration.

Some embodiments can further include other common components (not illustrated) of a virtual infrastructure, such as a monitoring service and/or a metrics analytics service. A monitoring service can analyze log data from at least some of the VMs. vRealize Log Insight by VMware is an example of a monitoring service. A metrics analytics service can analyze configuration, CPU/memory/storage/network properties and usage, VCI properties and state, computed metrics, etc. An example metrics analytics service can comprise at least one (virtual or non-virtual) computing device executing VMware vRealize Operations.

It will be appreciated that the illustrated infrastructure 100 is exemplary only and is based on a virtualized environment. Alternative embodiments may at least partially include non-virtualized components.

Figure 2:
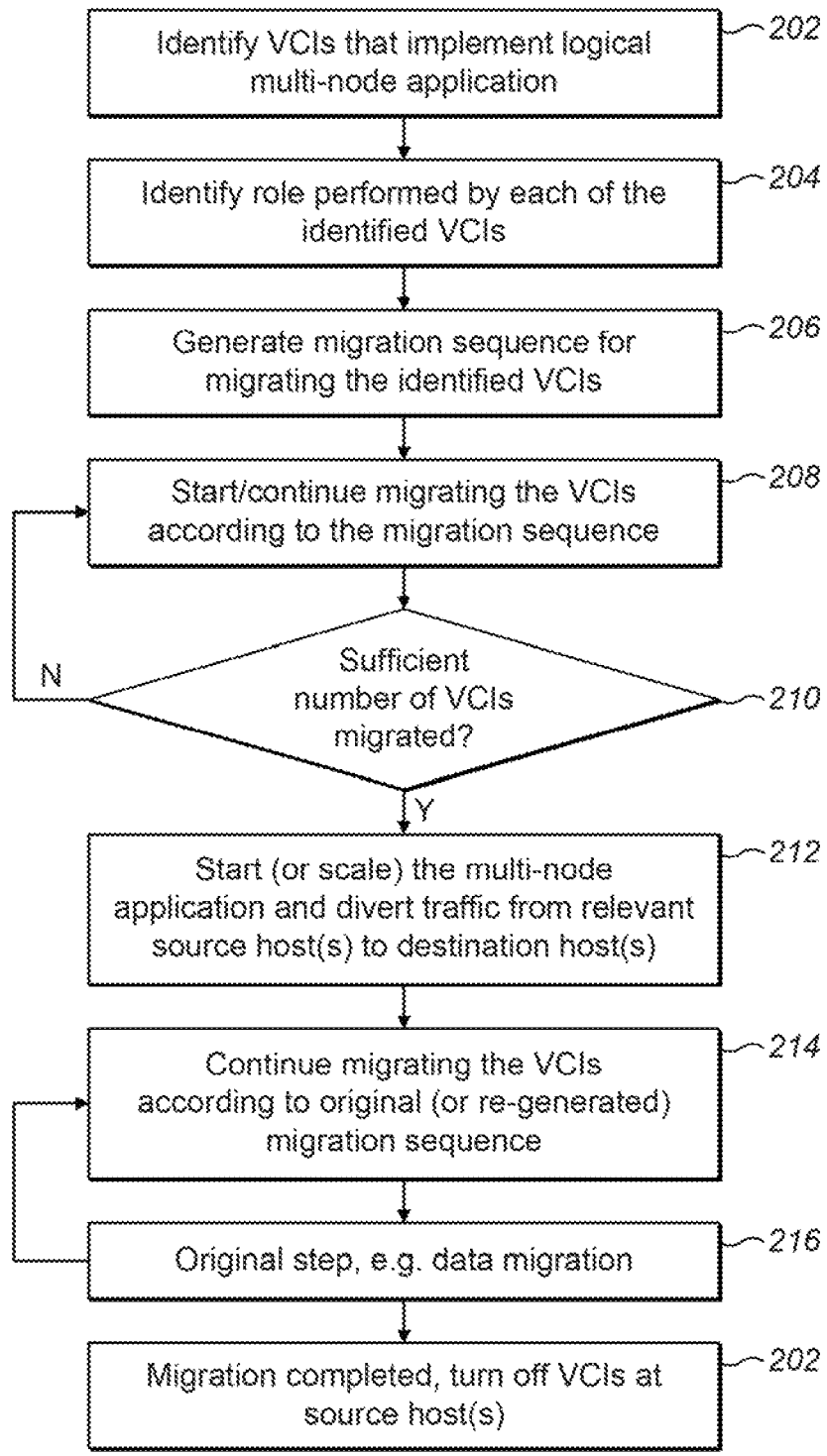
FIG. 2 is a flowchart illustrating steps performed by the example embodiment.

FIG. 2 is a flowchart illustrating steps performed by some embodiments. In some embodiments the steps may be performed by the migration manager service 146. However, in alternative embodiments at least some of the steps may be performed by at least one other computing device or VM. It will be appreciated that the steps shown in the flowcharts herein are exemplary only and in alternative embodiments some of the steps may be re-ordered and/or omitted. Further, additional steps (not shown in the flowcharts) may also be performed.

Some embodiments may be invoked when a process for migrating a logical multi-node application is started. This can be when a user or administrator issues a request to migrate the application to another data center/cloud, for example. Alternatively, the migration process may be started based on automated monitoring/determining that resources are to be re-allocated, e.g. when failure of at least one source host is detected; upon a determination that it would be more efficient, cheap, etc, to run the application at another data center/cloud, etc.

At step 202 of FIG. 2 some embodiments can identify a plurality of VCIs that implement the multi-node application.

At step 204 of FIG. 2 some embodiments can identify a role performed by each of the VCIs that were identified (at the step 202) as implementing the multi-node application.

The identifying of VCIs and roles by the steps 202-204 can be achieved using any suitable approach. An example approach is described in related U.S. patent application Ser. No. 15/287,799, titled "METHOD AND SYSTEM FOR MANAGING NETWORK NODES THAT IMPLEMENT A LOGICAL MULTI-NODE APPLICATION" and filed Oct. 7, 2016, the entirety of which is herein incorporated by reference. In this example, VCIs/nodes that implement a logical multi-node application can be identified by obtaining log data describing events relating to a plurality of VCIs, and obtaining network flow data describing flow of data between the plurality of VCIs. For example, the log data may include hardware and/or software events, such as inputs/outputs, user actions, success/failure, errors, etc. The network flow data may describe, for example, the amount of incoming/outgoing traffic per node or service, flow patterns, source/destination information, routing details, etc. The obtained log data can be analysed to identify at least one role performed by at least one of the plurality of VCIs, and the obtained network flow data can be analysed to detect at least one relationship between at least some of the plurality of VCIs. The at least one identified role and the at least one detected relationship can be analyzed to identify which of the network VCIs implement the logical multi-node application.

Some embodiments may generate data representing the results of the identification performed at the steps 202-204. The generated data can include information relating to each VCI that implements the multi-node application, such as VCI name/identifier; role name/identifier; source host name/identifier, etc.

Figure 3:
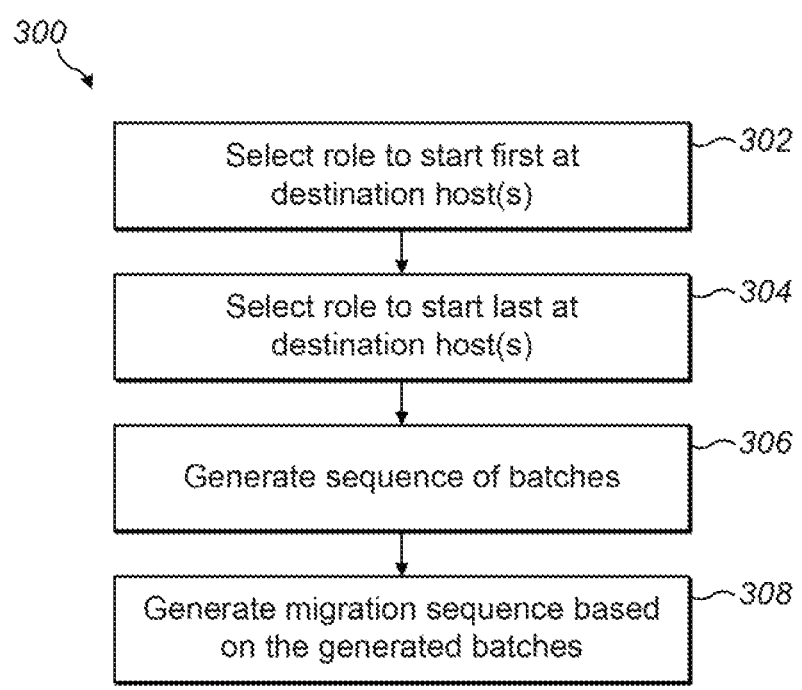
FIG. 3 is a flowchart illustrating operations that can be performed at a migration sequence generation step of the example embodiment.

At step 206 of FIG. 2 some embodiments can generate an initial migration sequence. The migration sequence can comprise an ordered sequence of batches, with each of the batches containing an ordered set of the VCIs that implement the multi-node application that have been selected based on the identified role of each VCI. The migration sequence will normally be generated in order to meet a migration goal, with the roles/VCIs included in each batch being selected (and typically ordered within the batch) in a manner that is intended to meet the migration goal. In general, an aim of the migration goal will be to prevent outage of the multi-node application during the migrating of the identified plurality of VCIs. However, the migration goal may also have other aims, such as starting/making public the services of the logical multi-node application using VCIs migrated to the destination host(s) as soon as possible during the migration process. FIG. 3 illustrates an example of how the migration sequence can be generated.

In some embodiments the migration goal may be set by a user, e.g. via a user interface of the migration service 146. Alternatively or additionally, a migration goal may be configured/set by the logical multi-node application itself as part of its design, deployment and/or management stages. In some cases, a provider of the infrastructure may be associated with an administrator and/or a developer of the logical multi-node application. In some embodiments the migration goal may be determined in an automated manner, e.g. based on migration, inventory and/or infrastructure monitoring information. For example, some embodiments may collect information regarding previous migration of the same (or similar) application and process that information to determine the present migration goal.

Some embodiments may base the migration goal on one or more goals set by the tenant of the datacentre/hosts during previous migration processes. Some embodiments may base the migration goal on information such as the price of resources, changes of prices of resources or other policy-based matters. Some embodiments may base the migration goal on information relating to network factors, such as available network bandwidth. In some embodiments if a monitoring or management service predicts a health issue relating to the source host (e.g. an inbound external network fail in the datacentre) then that may be used to determine the migration goal. For example, first/early batches of the migration sequence intended to meet the goal may be intended to migrate a sufficient set of VCIs that enable a minimal/partial service level agreement of the availability of the logical multi-node application to be met, with later batches meeting the migration goal being intended to scale up the migration of at least some of the remaining VCIs of the application to the destination host(s) using a working internal network. In some embodiments the migration goal may be intended to free resources of the source host(s) as efficiently/as soon as possible during the migration process. For example, VCIs/roles that have relatively high processor and/or memory usage compared to other VCIs/roles of the logical multi-node application may be included in the first/early batch(es) of the migration sequence. In some embodiments the migration goal may be intended to use resources of the destination host(s) as productively as possible and/or as late as possible during the migration process. For example, VCIs/roles that have relatively low processor and/or memory usage compared to other VCIs/roles of the logical multi-node application may be included in the last/late batch(es) of the migration sequence.

In some embodiments, if there no immediate network-related problems are detected/expected, then the migration goal may be set to migrate VCIs that perform slow starting roles (e.g. database servers) first and then migrate VCIs that perform other roles (e.g. web servers) that are not as slow to start. In some embodiments, the migration goal may be set to first migrate VCIs that perform a role that is relatively large in size (e.g. in terms of size of instruction set and/or related data used by the role) from amongst/compared to all the roles of the logical multi-node application. Such VCIs can be included in the first/early batch(es) of the migration sequence. In some embodiments, the migration goal may be set to later migrate VCIs that perform a role that is relatively small in size from amongst/compared to all the roles of the logical multi-node application. Such VCIs can be included in the final/late batch(es) of the migration sequence. This can allow the services of the logical-multi node application to be made public at full scale on the destination host(s) in a convenient manner. In some embodiments, the migration goal may be set to minimize, or reduce, costs associated with executing (or migrating) the VCIs of the logical multi-node application. For example, reduce/minimize a running cost of the source host(s) on which one or more VCIs of the application is/are being executed by migrating one or more VCIs to a destination host(s) having a relatively low/lower running cost, and/or reduce/minimize costs associated with the migration process, such as storage/network traffic price, partial application downtime/application scale decrease price, etc. In some embodiments, a migration goal set by a user may be prioritized over a migration goal determined in an automated manner.

At step 208 of FIG. 2 some embodiments can initially migrate VCIs from their respective source host(s) to respective destination host(s) according to a first batch of the generated migration sequence and employing any suitable migration technique. The VCIs of the logical multi-node application may be located on one or more source host and may be migrated to one or more destination host.

Some embodiments may pause execution of the VCIs to be migrated via the batch on the source host(s) prior to migrating the VCIs. Alternatively, these VCIs may be made unavailable on the source host(s) via network isolation or routing diversion prior to migration (i.e. traffic destined for the VCIs at the source host(s) is diverted to the peers at the source, or destination host(s) to await processing upon starting of the VCIs). Alternatively, VCIs already migrated via a previous batch, or batches, may be paused, or made unavailable via network isolation or routing diversion at their source host(s).

Some embodiments may perform the migration with traffic optimization. The traffic optimization can be achieved using any suitable approach. An example approach is described in related U.S. patent application Ser. No. 15/484, 049, titled "TRAFFIC OPTIMIZATION FOR MULTI-NODE APPLICATIONS" and filed on Apr. 10, 2017, the entirety of which is herein incorporated by reference. In this example, optimization factors (e.g. location-based or performance-based) are identified and used to re-route packets to a more optimal host by modifying header information. In particular, some embodiments may apply the "prefer-local-routing" technique described in that example.

Some embodiments may control/interrupt the migration process in certain circumstances. For example, some embodiments may prevent migration of a VCI configured to perform a particular role to a particular destination host if another VCI that performs the same role has previously/recently been migrated from that destination host (e.g. due to a failure condition and the failure condition still exists in the destination host, or there is a risk that the failure condition will re-emerge after migration).

At step 210 of FIG. 2 some embodiments determine whether a sufficient number of VCIs representing one or more of the roles has been migrated to the destination host(s) to start safe execution (i.e. with a zero or low probability of failure) of the multi-node application using VCIs that have been migrated to the destination host(s). Embodiments may determine the sufficient number of relevant role-performing VCIs that is to be met in various ways. For example, a logical multi-node application may work if, for example, one database server role VCI server is running; however, that would not be sufficient for large-scale operation of the application, as shown by monitoring services which indicate that application logs do not correspond to the average monitored situation (when dominant normalcy patterns are available) when the application was working as usual on the source host(s) prior to migration. Thus, log data can be used to determine whether a sufficient number of VCIs that perform all of the roles of the application are up and working.

Alternatively or additionally, some embodiments may use other indicators such as the quantity of log sources being within certain thresholds. For example, in a case where the application usually generates 10 k events using 10 web servers and 20 database servers, log data can be used to identify that after migration has started, this has changed to 100 web servers and 200 database servers. Such thresholds may be computed either dynamically/automatically, or they may be static based on manual administrator input. In an example, if the quantity/number of events indicated by the log data is above a 20% threshold then there should be 20 web servers and 40 database servers up and running on the destination host(s). If this is the case then a sufficient number of VCIs operational at the destination host(s) is determined, which can result in network isolation of those migrated VCIs being ended in order to make the logical multi-node application's services public at the destination host(s).

Some embodiments may use user-inputted information to determine which (and how many) role-specific VCIs need to be migrated in order for the application to be started on the destination host(s). For example, this can be set as a configuration of the migration service by an administrator of a data center.

Some embodiments may determine which and/or how many role-specific VCIs need to be migrated in order for the application to be started on the destination host(s) in an automated manner. For example, this may be determined based on information that is a historically learned mix of migration sequences. Such information can include: a previous successful migration plan (e.g. stored by a component of the infrastructure) of the same application or a similar application (e.g. if a first webmail application includes web server and database server and mail server roles and a second email application includes the same three types of roles then a successful migration sequence used for the first application may also be used for the second application). Alternatively or additionally, the information used to determine the migration goal can include inventory criteria, such as VCIs under-migration (where VCIs were kept together as near as possible, e.g. hosts of VCIs were in same resource pool/data center) and/or VCIs that are managed together (e.g. log data from VCI operating systems show related or similarly-ordered shutdown/start-up sequences). Alternatively or additionally, the information used to determine the migration goal can include a monitoring group (e.g. logs showing start-up order of main/critical apps inside a VCI (e.g. Apache for a web server role, MYSQL for database server role, etc) and/or markers of an application's normal successful operation. For example, if 2 database server roles started at a time t1 and 2 web server roles started at a time t2, with network monitoring showing that there were corresponding network connections between the web and database servers and logs indicating a successful status code. This information can be used to determine a desired start-up order of VCIs (i.e. VCIs performing the database server role followed by VCIs performing the web server role), and also to determine that 2 VCIs, with each VCI performing a respective one the roles, being migrated to the destination host(s) are sufficient to start the application on the destination host(s).

Alternatively or additionally, the information used to determine the migration goal can include: normalcy information indicating that VCIs performing specific roles are error-free; data that did not trigger alerts (e.g. logs corresponding to the average/dominant log structure for the application, such as when a web application is working properly, can indicate a http status code=200 for over 90% of Apache logs, or under 5% of http status codes in 5xx series (or other internal server errors), and MYSQL showing queries properly completed; metrics data showing CPU/RAM/storage-read-write usage within an average range of the application's execution); correlating metrics or network flow information (e.g. the load of a web server role being translated into a load of a database server role).

If a result of the determination made at the step 210 is positive then the multi-node application can be started at step 212. Some embodiments may start the application in accordance with a relevant sequence of VCI activation, e.g. following an order in which the migrated VCIs were started at their source host(s). At this step some embodiments can divert traffic intended for a VCI at its source host to the destination host to which the VCI has been migrated and started.

In some embodiments, after the VCIs in the first batch of the migration sequence have been migrated, VCIs migrated in a subsequent batch may be started at the step 212 and "join in" the execution of the multi-node application in combination with/in addition to other VCIs that were migrated in a previous batch or batches, thereby scaling up execution of the application on the destination host(s) whilst it is partially migrated. Traffic will be diverted to the VCIs started on the destination host(s) instead of the source host(s).

If the determination made at the step 210 is that a sufficient number of VCIs has not yet been migrated to the destination host(s) then control returns to the step 208 in order to continue with the migration process in order to migrate the VCIs included in the second/next batch (before starting to use VCIs that have been migrated to the destination host(s)).

At step 214 of FIG. 2 some embodiments can continue the process of migrating the VCIs that implement the multi-node application according to at least one subsequent batch of the migration sequence generated at the step 206 until the migration is complete. Diversion of traffic to VCIs migrated to, and started on, the destination host(s) can also continue.

Optionally, at the step 214, some embodiments may re-generate a new/updated migration sequence (at least once) and can then continue to migrate the VCIs according to the re-generated migration sequence(s) until migration of all of the VCIs that implement the multi-node application has been completed. The re-generation of the migration sequence can be performed at any suitable point during execution of the steps of some embodiments, and it may be triggered in various ways, e.g. based on changes in received monitored data; a periodic check, or based on user or hardware/software requests, etc.

The re-generation of the migration sequence may be performed in a similar manner to the step 206 described above in relation to VCIs that have not already started to be migrated. The same migration goal may be used for the re-generation. Alternatively, the migration goal may be adjusted, or a new/different migration goal can be used. This allows the migration sequence to be dynamically modified in a substantially real-time manner in response to changes in the environment/infrastructure 100. For example, if there is a change in bandwidth capacity between one or more of the source and the destination host(s) then the migration sequence may be re-generated in order to reflect this. As another example, if a need arises to prioritize migration of one or more processor-intensive VCIs then the migration sequence may be re-generated in order to achieve such prioritized migration. As yet another example, if the cost of one or more resources used (or potentially used) by the logical multi-node application changes (e.g., change in running cost of the source host(s) on which one or more VCIs of the application are being executed; changes in running cost of a destination host(s) on which one or more VCIs of the application could be migrated; change in cost associated with the migration process, such as storage/network traffic price, partial application downtime/application scale decrease price, etc), then the migration goal/sequence may be modified with the aim of reducing/minimizing such costs. FIGS. 4-7 illustrate examples of migration based on different migration goals.

At step 216 of FIG. 2 some embodiments may perform at least one optional step, such as performing data migration of data associated with the VCIs that have been migrated to destination host(s) by at least the current batch. In particular, if data processed by a particular VCI running on its source host changed whilst the VCI was being migrated to its destination host then this "delta" data may be migrated to the VCI on the destination host, either before it starts executing or afterwards.

At step 218 of FIG. 2 some embodiments turn off the VCIs on the source host(s) after all the VCIs that implement the multi-node application have been migrated. Thus, the multi-node application can continue to be successfully executed on the destination host(s) without any substantial interruption.

FIG. 3 schematically illustrates examples of operations that can be performed by some embodiments at the step 206 in order to generate a migration sequence.

At step 302 of FIG. 3 some embodiments can select at least one type of role from amongst the roles of the multi-node application that should be started first (or soon/early) on a destination host during the migration process. This is typically a role that is important in terms of avoiding failure and continued overall successful operation of the multi-node application and so at least one VCI performing this type of role should be made available/operational on its destination host as soon as possible during migration. Some embodiments may determine that this type of role is critical for the logical multi-node application to function properly and so should be migrated/started first at the destination host(s).

An example of this type of role comprises a role that is a destination of most connections in the multi-node application. Another example is a role that has been identified as particularly problematic, e.g. previous monitoring determined that the role caused a large (e.g. above a predetermined threshold), or the greatest, number of errors, or the most critical errors, within the multi-node application when the role was unavailable or not fully operational. As an example, log data can be used to determine that a role performed by VCIs that were down/inaccessible produced a certain threshold level of errors (e.g. over 10% of error events that seriously impact application health). For an application comprising web server and database server roles, for example, when the database server is down and the web server is running, every single client request to the web server requesting data from the database server results in an error being logged at the web server. However, when the database server is up and the web server is down, no errors are logged (however, as no client was serviced in this case, the log information will differ from average logs and show the situation as not critical, but also not sufficient to make the VCIs migrated to the destination host(s) public/operational). Based on such log information, some embodiments can determine that the database server role is critical and so should be migrated first, whilst the web server role does not need to be migrated first. Alternatively or additionally, in some embodiments information from a monitoring service could be used for these purposes.

At step 304 of FIG. 3 some embodiments can select at least one type of role from amongst the roles of the multi-node application that should start last (or late) on a destination host during the migration process. This is typically a type of role that is important in terms of continued successful overall operation of the multi-node application (e.g. the multi-node application could attempt to process a role that is not fully ready because it is reliant on another role that needs to be available/executed first) and so at least one VCI performing this type of role should remain available on its source host for as long as possible during the migration process.

For example, this type of role may be selected as an input-point role, i.e. a role that initially receives user input for the multi-node application or where a client device request is entered into the multi-node application. For instance, for a webmail multi-node application having web, mail and database servers/roles, the input-point role can comprise the web server role where client requests are initially received and then further processed, or a role that is a point though which external clients interact with the application. Another example of this type of role is a role where processing of a user or client request terminates, such as a database server role where a client asks data from a web server at the source. In this case the web server gets data from the database server so that the web server can provide the data to the client. Another example of this type of role is a role that has been identified as non-problematic, e.g. previous monitoring determined that the role caused few (e.g. below a predetermined threshold), or least number of, errors within the multi-node application when the role was unavailable or not fully operational. Yet another example of this type of role is a role that functions as a source of a greatest number of connections within the multi-node application (i.e. a "most chatty" role). Such a role can be selected on the basis of network flow criteria, e.g. bandwidth usage and/or frequency of connections. Such network flow information may be determined, for example, in the manner disclosed in the related U.S. patent application Ser. No. 15/287,799 referenced above. It will be appreciated that the steps 302-304 are optional and some embodiments may not select either or both of these types of roles. For example, the embodiment illustrated in FIG. 4 may not involve specifically selecting these types of roles.

At step 306 of FIG. 3 some embodiments can generate a sequence of batches, where each of the batches contains an ordered set of VCIs that are to be migrated from their source host(s) to their destination host(s). These will include a first batch that will be the first batch of VCIs to be migrated when migration begins. At least one subsequent batch (also containing an ordered set of VCIs) to be included in the migration sequence will also be generated. In some embodiments not all of the batches generated will be identical in terms of the number and arrangement of VCIs selected by role they include. For instance, some embodiments may give special consideration to the VCI/roles to be included in at least the first and/or the last batch of the migration sequence.

Each batch can include an ordered set comprising a certain number of VCIs that are selected based upon the roles they perform. The certain number of VCIs included in each batch may be determined in any suitable manner, e.g. based on available transfer capacity of the network link(s) between the source host(s) and the destination host(s). For example, the available transfer capacity may allow a set of 50 VCIs to be migrated between source and destination hosts during a certain timeframe/slot.

Some embodiments may select specific VCIs that perform each of the roles that are to be included in a batch. If there is more than one VCI that performs a certain role then a particular VCI from amongst those VCIs may be selected in any suitable manner, e.g. according to a characteristic of the source host (e.g. real/virtual memory or processor usage) and/or network connection (e.g. distance or transfer capacity between source and destination hosts); according to an order in a stored list/data structure of VCIs, based on not serving any incoming requests or finishing serving most of incoming requests at the time of the batch formation or transfer; selected in a random manner, etc.

Some embodiments may select the VCIs to be included in each batch, and the order of the VCIs within each batch, based on a migration goal and/or infrastructure monitoring criteria (e.g. bandwidth capacity between source and destination hosts, resource availability/usage, etc). For instance, a migration goal may be intended to provide insurance against possible net outage of the multi-node application during the migration process by having a minimal working set of application-comprising VCIs ready on the destination host(s). In one such example, one from each of database server and web server role VCIs of the logical multi-node application can be included in the first batch because they are the most connected roles, and then a single dedicated application monitoring role VCI can be included in a second batch, etc.

The migration goal may take into account the starting order of migrated VCIs on the destination host(s). For example, it is typically important to have a VCI that performs a database server role ready before a VCI performing a web server role begins requesting data from it. This selection of VCIs for inclusion in batches can leverage the start first/start last roles discussed above when the migration manager 146 generates the migration sequence; however, some information regarding how the destination host(s) should process a batch of VCIs may be communicated by the migration manager to the destination host(s). In another example based on bandwidth capacity between source and destination hosts, the migration logic may allow the number of VCIs performing a particular (processor intensive) role to vary between 5 and 10 per batch. If the logic is currently including 5 VCIs that perform that role in a batch, but the source host becomes more stressed in terms of processor usage, then the current/subsequent batch(es) may increase the number of VCIs performing that role up to 10, which is within the limit.

In some embodiments the first batch will include at least one VCI configured to perform each of the identified roles of the multi-node application. For instance, if there are three identified roles (e.g. web server, email server and database server) then the first batch will include at least one VCI configured to perform the web server role, at least one VCI configured to perform the email server role, and at least one VCI configured to perform the database server role. The final VCI in the first batch may comprise at least one VCI that performs the type of role that should start last on the destination host during the migration process for reduced overall application failure risk.

Detailed examples of VCI selection for generation of batches that make up a migration sequence will be given below with reference to FIGS. 4-7.

Some embodiments may store data relating to the generated batches. For example, a data structure comprising a table, or any other suitable format, can describe the batches and include information relating to the VCIs to be migrated (e.g. VCI identifier, role type information, source host identifier, etc) and, optionally, information relating to the destination host(s) (e.g. destination host identifier, routing information, etc). Additional information may also be stored/processed in some embodiments. For instance, information relating to migration priority and start-on-destination-host order for a particular role/VCI. An example of the type of information that can be generated relating to one VCI included in a batch is given below:

VCI-id=vm-guid-5,
role=db,
source-host=host1,
migration-priority=batch2,
start-on-destination=$1^{st}$-within-batch (or after vm-guid-4),
sufficient-to-start-or-scale-destination=true The "start-on-destination" value can be used to indicate the order in which the VCIs should be started on the host destination. The "sufficient-to-start-or-scale-destination" value can be used to indicate that the batch of VMs can be used to scale execution of the multi-node application by "joining" the VCIs that have already been migrated. This can, for example, help prevent end network isolation between the VCIs in the batch and other VCIs. Alternatively, the "start-on-destination" value may indicate that the db role VCI should be started as soon as possible after it is migrated to the destination host, with the remaining VCIs in the batch being booted after this has been successfully done.

At step 308 of FIG. 3 some embodiments can generate a migration sequence based on the generated batches. Some embodiments may generate the migration sequence as a data structure (e.g. list) that contains an ordered sequence of the batches, i.e. the first batch of VCIs, followed by the second batch of VCIs, and so on, up to and including the final generated batch. This data, or part thereof, can then be used by any processor, device, VM and/or service that implements the migration of the VCIs.

Figure 4:
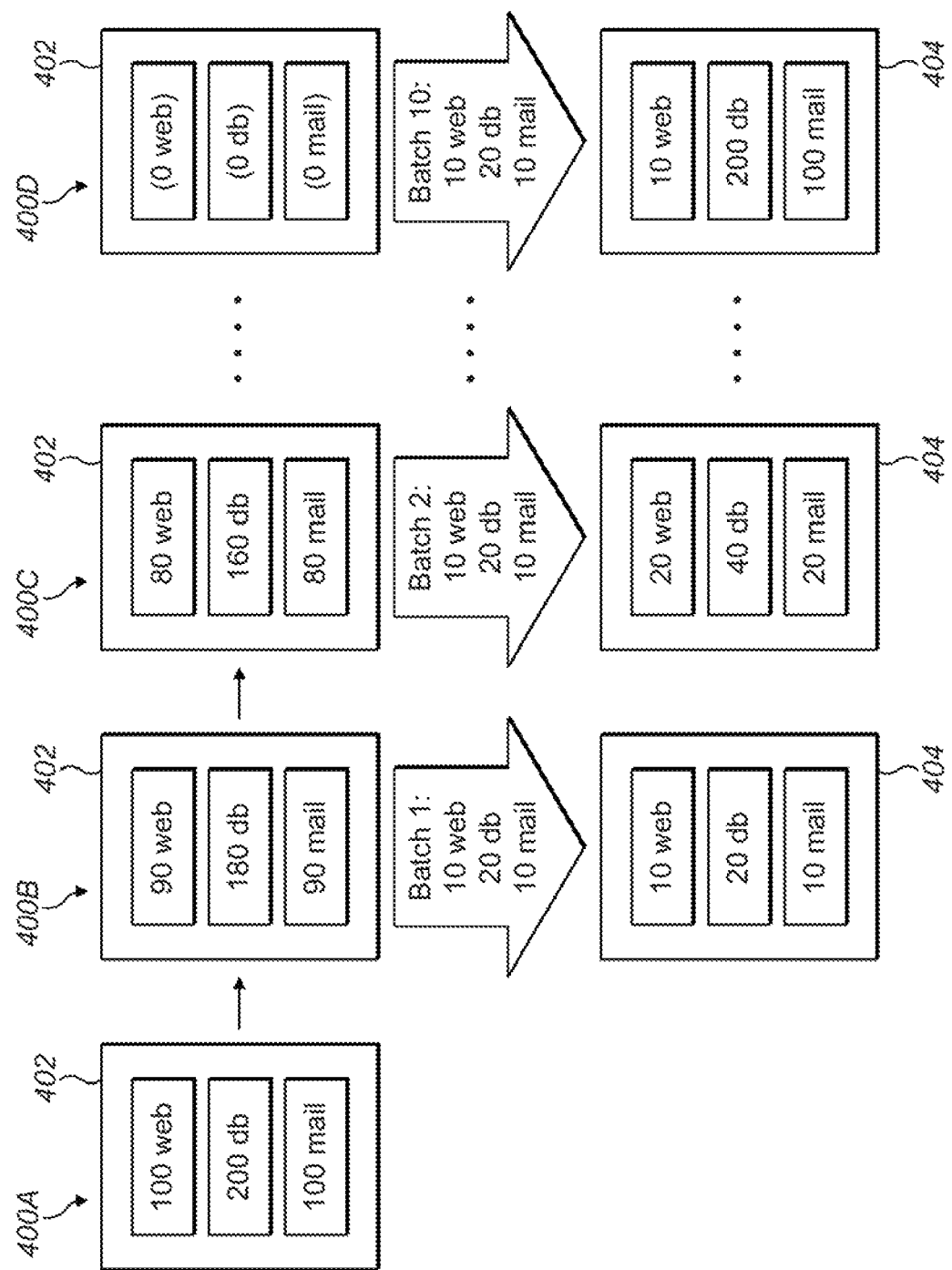
FIG. 4 schematically illustrates a first example of VCI migration according to an embodiment.

FIG. 4 schematically illustrates a first example of how a migration sequence generated by an embodiment of the method can migrate VCIs implementing a multi-node application from a set of source hosts to a set of destination hosts. Each of the sets may comprise at least one host hardware platform.

In the example of FIG. 4 a set of source hosts 402 execute a multi-node application that comprises three roles, with 100 VCIs implementing a web server role, 200 VCIs implementing a database server role, and 100 VCIs implementing a mail server role (as identified by the steps 202-204 of FIG. 2). Thus, a total of 400 VCIs are to be migrated to a set of destination hosts 404.

Area 400A of FIG. 4 illustrates the source hosts 402 before the migration process starts, with all of the VCIs of the multi-node application being present on the source hosts. The destination hosts 404 may include VCIs that at this time are performing operations other than the roles of the logical multi-node application that is being migrated. After the migration process is initiated, the embodiment generates a migration sequence as described above (the step 206 of FIG. 2), with the batches of VCIs in the migration sequence being generated based on a migration goal that is intended to migrate VCIs so that proportional numbers of each role are included in each batch (that is, the number of VCIs that perform a particular role in each batch corresponds proportionally to the overall number of VCIs that perform that role in the multi-node application). Thus, transfers and transfer interruptions should have little impact on the multi-node application VCIs running on the source or destination hosts, offering efficient resource usage (most migrated VCIs join the logical application at the destination due to having corresponding quantity of other role representatives present with them). The bandwidth capacity for migration in the example is determined as a total of 40 VCIs and so each batch will contain (up to) 40 VCIs.

Area 400B of FIG. 4 illustrates the source hosts 402 and destination hosts 404 after VCIs have been migrated according to a first batch of the migration sequence. The first batch was generated to contain: 10 VCIs implementing the web server role, followed by 20 VCIs implementing the database server role, and followed by 10 VCIs implementing the mail server role. It will be understood that in alternative embodiments, the order of the VCIs within the batch can vary, e.g. a first of the web server role VCIs, followed by a first of the database server role VCIs, followed by a first of the mail server role VCIs, followed by a second of the web server role VCIs, and so on, or an order may be selected based on at least one characteristic of the source host, destination host and/or network connection, etc.

The migration method/goal determines that having one batch of these proportional numbers of VCIs migrated to the destination hosts 404 is sufficient to allow execution of the multi-node application to start using the VCIs that have been migrated to the destination host and so traffic diversion is also implemented (the steps 210-212 of FIG. 2). Migration according to the subsequent batches of the migration sequence continues (the step 214 of FIG. 2).

Area 400C of FIG. 4 illustrates the source hosts 402 and the destination hosts 404 after VCIs have been migrated according to a second batch of the migration sequence. The second batch was also generated to contain: 10 VCIs implementing the web server role, followed by 20 VCIs implementing the database server role, and followed by 10 VCIs implementing the mail server role.

For brevity, the third to ninth batches are not illustrated in FIG. 4, but it will be understood that each of these batches will migrate a further 10 VCIs implementing the web server role, 20 VCIs implementing the database server role, and 10 VCIs implementing the mail server role to the destination hosts 404.

Area 400D of FIG. 4 illustrates the source hosts 402 and the destination hosts 404 after VCIs have been migrated according to a tenth/final batch of the migration sequence. The tenth batch was also generated to contain: 10 VCIs implementing the web server role, followed by 20 VCIs implementing the database server role, and followed by 10 VCIs implementing the mail server role. Thus, all of the VCIs that implement the multi-node application have been migrated to their destination hosts and so the VCIs at the source hosts can be turned off (at the step 218 of FIG. 2).

Figure 5:
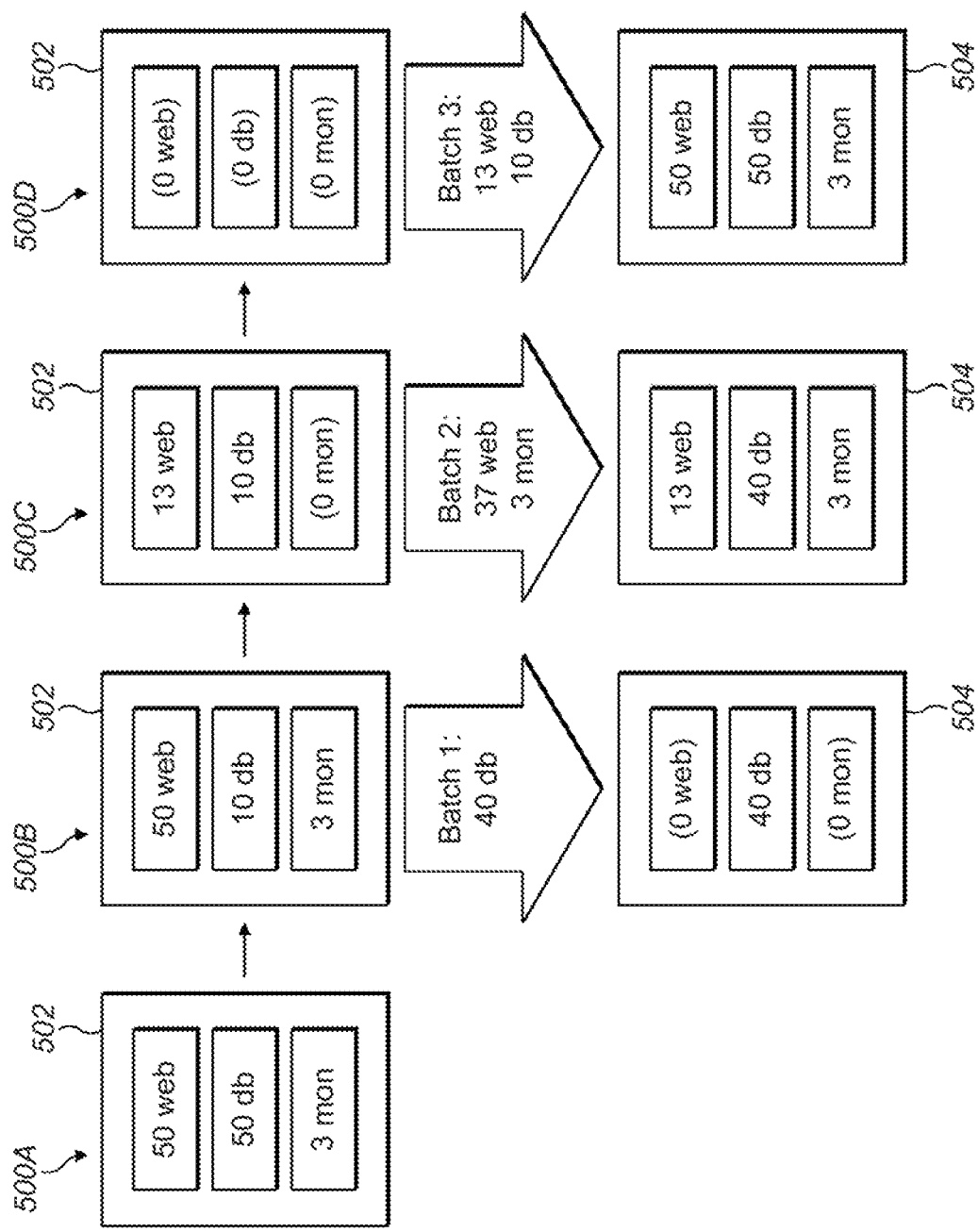
FIG. 5 schematically illustrates a second example of VCI migration according to an embodiment.

FIG. 4 illustrates a simple example where the migration sequence is not re-generated (at the step 214) or any optional steps are performed (at the step 216). Further, in the example of FIG. 4 all of the batches in the migration sequence are identical in terms of the number of VCIs configured to perform each type of role of the multi-node application they contain. However, for flexibility in terms of meeting other migration goals, embodiments may generate and process various types of batches. In particular, some embodiments may generate and use the following types of batches:

"All": batch contains at least one VCI that implements each role that makes up the multi-node application "Some": batch contains no VCIs that implement at least one particular role at the source "Same": all VCIs contained in the batch implement the same role "Special": batch contains specific combination of VCIs that perform specific roles FIG. 5 schematically illustrates a second example of how a migration sequence generated by an embodiment of the method can migrate VCIs implementing a multi-node application from a set of source hosts to a set of destination hosts. Each of the sets may comprise at least one host hardware platform.

In the example of FIG. 5 a set of source hosts 502 execute a multi-node application that comprises three roles, with 50 VCIs implementing a web server role, 50 VCIs implementing a database server role, and 3 VCIs implementing a monitoring role (identified by the steps 202-204 of FIG. 2). Thus, a total of 103 VCIs are to be migrated to a set of destination hosts 504.

Area 500A of FIG. 5 illustrates the source hosts 502 before the migration process starts, with all of the VCIs of the multi-node application being present on the source hosts. After the migration process is initiated, the embodiment generates a migration sequence as described above (the step 206 of FIG. 2), with the batches of VCIs in the migration sequence being generated based on a migration goal. In this example the database server roles/VCIs are slow to start relative to the other roles/VCIs and so the migration goal is intended to migrate a greater number of the VCIs that implement the database server role sooner than VCIs that implement the other roles.

Some embodiments may deduce that VCIs performing a certain role, such as the database server of the example, are slow to start based on information obtained from logs. For instance, some embodiments may monitor how long a period of silence/no communication lasted (e.g. no MYSQL database service logs during OS rebooting), then use MYSQL logging indicating that the database service within the VCI has started, and then average a MYSQL-query-serviced-ok log pattern. Some embodiments may correlate errors on a related web server role which received errors, followed by normal operation, when querying MYSQL database server during the database server OS or service restart. Such embodiments may compute a time at which the OS started by setting tmarker1=MYSQL starting, then setting tmarker2=MYSQL started and serviced a query. The duration for the database role to start can then be calculated as: duration=tmarker2−tmarker1.

The bandwidth capacity for migration in the example is determined as a total of 40 VCIs and so each batch will contain (up to) 40 VCIs.

Area 500B of FIG. 5 illustrates the source hosts 502 and the destination hosts 504 after VCIs have been migrated according to a first batch of the migration sequence. The first ("same" type) batch was generated to contain 40 VCIs implementing the database server role in accordance with the migration goal.

Area 500C of FIG. 5 illustrates the source hosts 502 and the destination hosts 504 after VCIs have been migrated according to a second batch of the migration sequence. The second ("some" type) batch was generated to contain 37 VCIs implementing the database server role and 3 VCIs implementing the monitoring role.

The migration method/goal determines that having one batch of these proportional numbers of VCIs migrated to the destination hosts 504 is sufficient to allow execution of the multi-node application to start using the VCIs that have been migrated to the destination host and so traffic diversion is also implemented (the steps 210-212 of FIG. 2). Migration according to the subsequent batches of the migration sequence continues (the step 214 of FIG. 2).

Area 500D of FIG. 5 illustrates the source hosts 502 and the destination hosts 504 after VCIs have been migrated according to a third batch of the migration sequence. The third batch was generated to contain the remaining 10 VCIs implementing the database server role and 13 VCIs implementing the web role. The VCIs of the third batch join the VCIs migrated by the previous batches. Additional traffic originally directed to the VCIs of the third batch at their source hosts can now be diverted. An optional step (the step 216 of FIG. 2) may be performed at this point, e.g. migration of data associated with the VCIs that have been migrated to destination hosts. Thus, all of the VCIs that implement the multi-node application have been migrated to their destination hosts and so the VCIs at the source hosts can be turned off (at the step 218 of FIG. 2).

Figure 6:
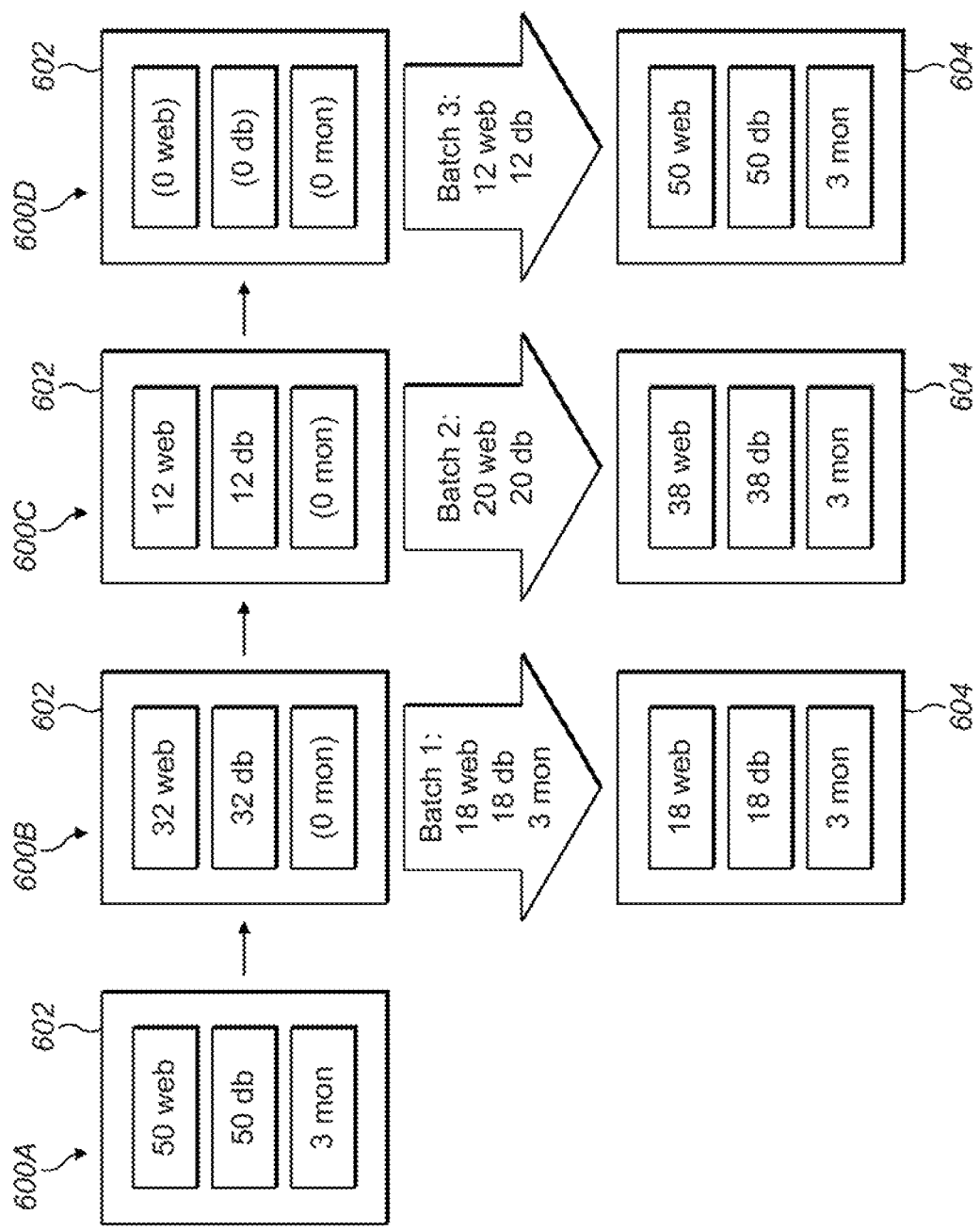
FIG. 6 schematically illustrates a third example of VCI migration according to an embodiment.

FIG. 6 schematically illustrates a third example of how a migration sequence generated by an embodiment of the method can migrate VCIs implementing a multi-node application from a set of source hosts to a set of destination hosts. Each of the sets may comprise at least one host hardware platform.

In the example of FIG. 6 a set of source hosts 602 execute the same multi-node application as FIG. 5 that comprises three roles, with 50 VCIs implementing a database server role, 50 VCIs implementing a web server role, and 3 VCIs implementing a monitoring role (identified by the steps 202-204 of FIG. 2). Thus, again, a total of 103 VCIs are to be migrated to a set of destination hosts 604.

Area 600A illustrates the source hosts 602 and the destination hosts 604 before the migration process starts, with all of the VCIs of the multi-node application being present on the source hosts. After the migration process is initiated, the embodiment generates a migration sequence as described above (the step 206 of FIG. 2), with the batches of VCIs in the migration sequence being generated based on a migration goal that is intended to start the multi-node application on the destination hosts as soon as possible. The bandwidth capacity for migration in the example is again determined as a total of 40 VCIs and so each batch will contain (up to) 40 VCIs.

Area 600B of FIG. 6 illustrates the source hosts 602 and the destination hosts 604 after VCIs have been migrated according to a first batch of the migration sequence. The first ("all" type) batch was generated to contain 18 VCIs implementing the database server role; 18 VCIs implementing the web server role and 3 VCIs implementing the monitoring role in accordance with the migration goal.

The migration method/goal determines that having one batch of these proportional numbers of VCIs migrated to the destination hosts 604 is sufficient to allow execution of the multi-node application to start using the VCIs that have been migrated to the destination host and so traffic diversion is also implemented (the steps 210-212 of FIG. 2). Migration according to the subsequent batches of the migration sequence continues (the step 214 of FIG. 2).

Area 600C of FIG. 6 illustrates the source hosts 602 and the destination hosts 604 after VCIs have been migrated according to a second batch of the migration sequence. The second batch was generated to contain 20 VCIs implementing the database server role and 20 VCIs implementing the web server role. The VCIs of the second batch join the VCIs migrated by the previous batches. Additional traffic originally directed to the VCIs of the second batch at their source hosts can now be diverted.

Area 600D of FIG. 6 illustrates the source hosts 602 and the destination hosts 604 after VCIs have been migrated according to a third batch of the migration sequence. The third batch was generated to contain the remaining 12 VCIs implementing the database server role and 12 VCIs implementing the web role. The VCIs of the third batch join the VCIs migrated by the previous batches. Additional traffic originally directed to the VCIs of the third batch at their source hosts can now be diverted. An optional step (the step 216 of FIG. 2) may be performed at this point, e.g. migration of data associated with the VCIs that have been migrated to destination hosts. Thus, all of the VCIs that implement the multi-node application have been migrated to their destination hosts and so the VCIs at the source hosts can be turned off (at the step 218 of FIG. 2).

Figure 7:
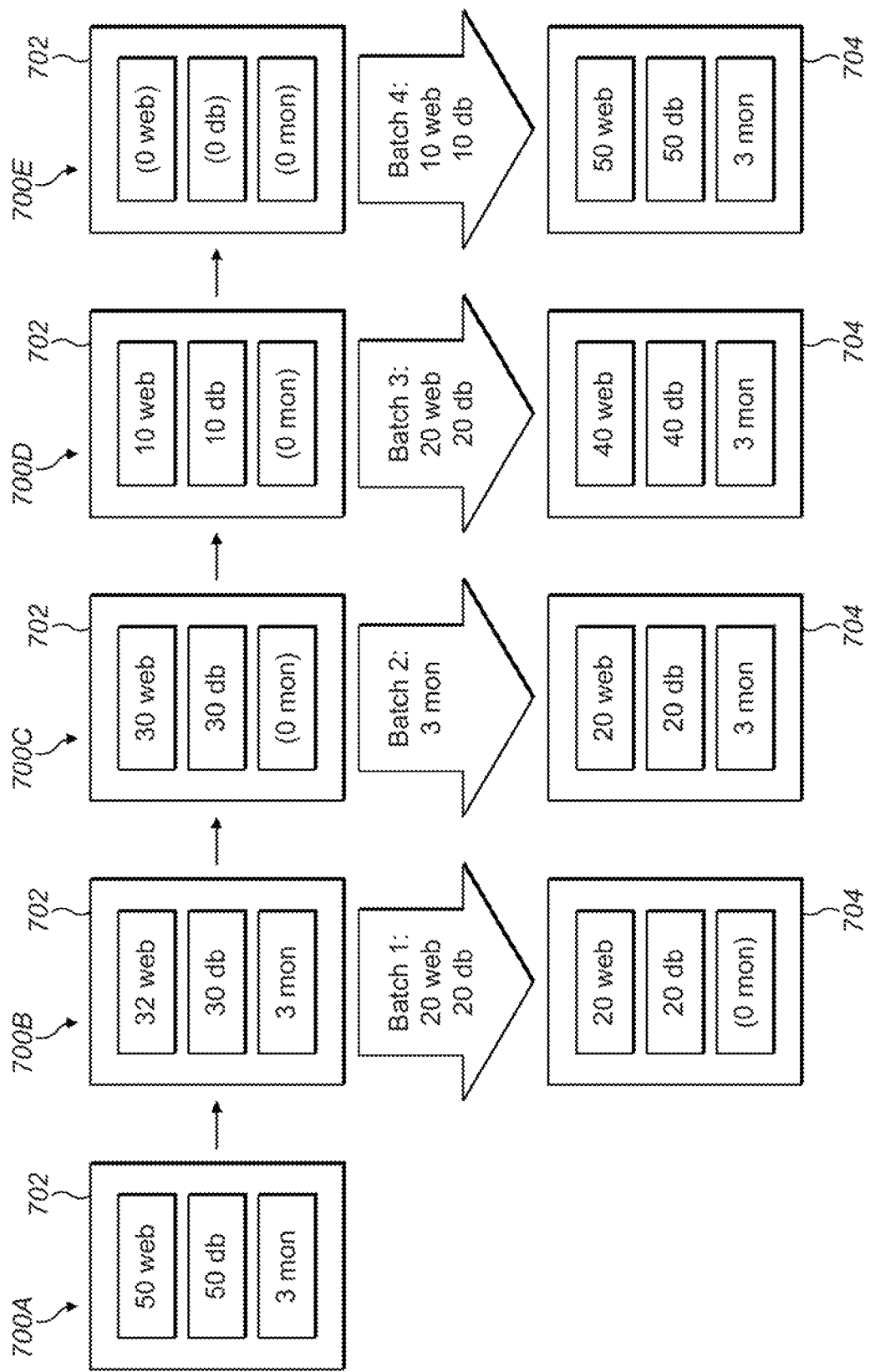
FIG. 7 schematically illustrates a fourth example of VCI migration according to an embodiment.

FIG. 7 schematically illustrates a fourth example of how a migration sequence generated by an embodiment of the method can migrate VCIs implementing a multi-node application from a set of source hosts to a set of destination hosts. Each of the sets may comprise at least one host hardware platform.

In the example of FIG. 7 a set of source hosts 702 execute the same multi-node application as FIGS. 5-6 that comprises three roles, with 50 VCIs implementing a database server role, 50 VCIs implementing a web server role, and 3 VCIs implementing a monitoring role (identified by the steps 202-204 of FIG. 2). Thus, again, a total of 103 VCIs are to be migrated to a set of destination hosts 704.

Area 700A illustrates the source hosts 702 and the destination hosts 704 before the migration process starts, with all of the VCIs of the multi-node application being present on the source hosts. After the migration process is initiated, the embodiment generates a migration sequence as described above (the step 206 of FIG. 2), with the batches of VCIs in the migration sequence being generated based on a migration goal that is intended to start the multi-node application on the destination hosts as soon as possible whilst allowing time for critical web and database application servers to start before VCIs that perform the secondary monitoring role are migrated. The bandwidth capacity for migration in the example is again determined as a total of 40 VCIs and so each batch will contain (up to) 40 VCIs.

Area 700B of FIG. 7 illustrates the source hosts 702 and the destination hosts 704 after VCIs have been migrated according to a first batch of the migration sequence. The first batch was generated to contain 20 VCIs implementing the database server role and 20 VCIs implementing the web server role in accordance with the migration goal.

Area 700C of FIG. 7 illustrates the source hosts 702 and the destination hosts 704 after VCIs have been migrated according to a second batch of the migration sequence. The second batch was generated to contain all 3 VCIs that implement the monitoring role. This is an example of the "special" type of batch that contains VCIs that implement the same role, but the number of VCIs in the batch is limited to less than the maximum number available in order to assist with meeting the migration goal.

The migration method/goal determines that having one batch of these proportional numbers of VCIs migrated to the destination hosts 704 is sufficient to allow execution of the multi-node application to start using the VCIs that have been migrated to the destination host and so traffic diversion is also implemented (the steps 210-212 of FIG. 2). Migration according to the subsequent batches of the migration sequence continues (the step 214 of FIG. 2).

Area 700D of FIG. 7 illustrates the source hosts 702 and the destination hosts 704 after VCIs have been migrated according to a third batch of the migration sequence. The third batch was generated to contain 20 VCIs implementing the database server role and 20 VCIs implementing the web role. The VCIs of the third batch join the VCIs migrated by the previous batches. Additional traffic originally directed to the VCIs of the third batch at their source hosts can now be diverted.

Area 700E of FIG. 7 illustrates the source hosts 702 and the destination hosts 704 after VCIs have been migrated according to a fourth batch of the migration sequence. The fourth batch was generated to contain the remaining 10 VCIs implementing the database server role and 10 VCIs implementing the web role. The VCIs of the fourth batch join the VCIs migrated by the previous batches. Additional traffic originally directed to the VCIs of the fourth batch at their source hosts can now be diverted. An optional step (the step 216 of FIG. 2) may be performed at this point, e.g. migration of data associated with the VCIs that have been migrated to destination hosts. Thus, all of the VCIs that implement the multi-node application have been migrated to their destination hosts and so the VCIs at the source hosts can be turned off (at the step 218 of FIG. 2).

Thus, embodiments can offer logical multi-node application-aware migration of VCIs that implement the application. Embodiments can advantageously select the order in which the VCIs are migrated in order to meet a migration goal, such as avoiding/reducing risk of outage of the logical multi-node application during the migration process.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, it will be understood that that the invention can be embodied in other specific forms without departing from the spirit of the invention. For instance, this specification refers throughout to computational and network environments that include virtual machines (VMs). However, virtual machines are merely one example of data compute nodes (DCNs). DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. Whilst the specification refers to VMs, the examples given could be any type of DCNs, including physical hosts, VMs, non-VM containers, and hypervisor kernel network interface modules. In fact, the example networks could include combinations of different types of DCNs in some embodiments.

A number of the figures (e.g., FIGS. 2 and 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. In view of the foregoing, it will be appreciated that the invention is not to be limited by the foregoing illustrative details, but rather is to be defined by the appended claims.

What is claimed is:

1. A computer-implemented method of migrating virtualized computing instances (VCIs) that implement a logical multi-node application, the method comprising:
   identifying a plurality of Vas that implement a logical multi-node application, each of the plurality of Vas being executed on a respective source host;
   identifying a role, associated with one or more functionalities of the logical multi-node application, performed by each VCI of the identified plurality of VCIs;
   generating a plurality of batches, each batch of the plurality of batches including a set of the identified plurality of Vas selected based on the identified role of each of the VCIs;
   generating a migration sequence comprising an ordered sequence of the plurality of batches;
   migrating the identified plurality of Vas from its respective source host to a respective destination host according to the migration sequence; and
   selecting the set of identified Vas included in each batch of the plurality of batches which comprises: selecting a first role from amongst the roles performed by the plurality of Vas that is to be started first on a destination host during the migrating of the identified plurality of Vas and including at least one of the identified Vas that performs the first role in a first batch of the migration sequence.

2. A method according to claim 1, wherein the first role comprises:
   a role amongst the roles performed by the plurality of Vas that is a destination of most connections between the roles of the logical multi-node application, or
   a role amongst the roles performed by the plurality of Vas found to cause a majority of errors within the logical multi-node application, or
   a role amongst the roles performed by the plurality of Vas that is slowest to become fully operational after being started, or
   a role amongst the roles performed by the plurality of Vas that is relatively large in size, or
   a role amongst the roles performed by the plurality of Vas that has relatively high processor and/or memory usage.

3. A method according to claim 1, wherein the selecting the set of identified Vas included in each batch of the plurality of batches comprises:
   selecting a last role from amongst the roles performed by the plurality of Vas that is to be started last on a destination host during the migrating of the identified plurality of VCIs, and
   including at least one of the identified Vas that performs the last role in a last batch of the migration sequence.

4. A method according to claim 3, wherein the last role comprises:
   a role amongst the roles performed by the plurality of Vas that functions as an input-point for the logical multi-node application, or
   a role amongst the roles performed by the plurality of Vas where processing of a user or client request terminates, or
   a role amongst the roles performed by the plurality of Vas that functions as a source of a greatest number of connections between the roles of the logical multi-node application, or
   a role amongst the roles performed by the plurality of Vas found to cause a minority of errors within the logical multi-node application,
   a role amongst the roles performed by the plurality of Vas that is fastest to become fully operational after being migrated, or
   a role amongst the roles performed by the plurality of Vas that is relatively small in size, or
   a role amongst the roles performed by the plurality of Vas that has relatively low processor and/or memory usage.

5. A method according to claim 1, wherein the selecting the set of identified Vas included in the first batch of the plurality of batches comprises selecting at least one identified VCI that performs each of the roles associated with one or more functionalities of the logical multi-node application.

6. A method according to claim 1, wherein the selecting the set of identified Vas included in the first batch of the plurality of batches comprises:
   selecting a number of Vas that perform each of the roles of the logical multi-node application for inclusion in at least one batch of the plurality of batches,
   wherein the selected number corresponds proportionally to a total number of the Vas that perform each of the roles in the logical multi-node application.

7. A method according to claim 1, further comprising:
   generating an updated plurality of batches, each batch of the updated plurality of batches including a set of the identified plurality of Vas not yet migrated to the respective destination host selected based on the identified role of each of the VC's;
   generating an updated migration sequence comprising an ordered sequence of the updated plurality of batches, and
   migrating each of the identified plurality of Vas not yet migrated to the respective destination host from its respective source host to its respective destination host according to the updated migration sequence.

8. A method according to claim 7, wherein the step of generating the updated plurality of batches is performed in response to a detected change in an environment or network including the source host and/or the destination host that executes at least one VCI of the identified plurality of VCIs.

9. A method according to claim 8, wherein the detected change comprises:
   a change in bandwidth capacity between one or more of the source host and the destination host, or
   a change in usage intensity of a processor of the source host, or
   a change in a running cost of the source host and/or the destination host, or
   a change in a cost associated with the migrating of the identified plurality of VCIs.

10. A method according to claim 9, wherein the step of generating the updated plurality of batches comprises increasing or decreasing a number of Vas being executed on the processor experiencing the change in usage intensity included in at least a current batch of the updated plurality of batches.

11. A method according to claim 1, further comprising:
    determining whether the Vas migrated to the respective destination hosts are sufficient to allow safe execution of the logical multi-node application using at least some of the Vas migrated to the respective destination hosts, and
    starting the Vas migrated to the respective destination hosts based on the determination.

12. A method according to claim 11, further comprising diverting traffic destined for the at least some Vas started on the respective destination hosts from the respective source hosts to the respective destination hosts.

13. A method according to claim 12, further comprising starting, on the respective destination hosts, at least some others of the Vas migrated to the respective destination hosts after the at least some Vas have been started on the destination hosts.

14. A method according to claim 1, further comprising stopping the migrating of one of the identified plurality of Vas from its respective source host to its respective destination host when another VCI of the identified plurality of Vas that performs a same role was previously migrated from the respective destination host due to a failure condition.

15. A method according to claim 1, further comprising migrating, to the destination host, data associated with one of the Vas migrated to the destination host, wherein the data has been changed at the respective source host during the migration of the VCI to the respective destination host.

16. A non-transitory machine readable medium storing a program which when executed by at least one processing unit migrates virtualized computing instances (VCIs) that implement a logical multi-node application, the program comprising sets of instructions for:
    identifying a plurality of Vas that implement a logical multi-node application, each of the plurality of Vas being executed on a respective source host;
    identifying a role, associated with one or more functionalities of the logical multi-node application, performed by each VCI of the identified plurality of VC's;
    generating a plurality of batches, each batch of the plurality of batches including a set of the identified plurality of Vas selected based on the identified role of each of the VC's;
    generating a migration sequence comprising an ordered sequence of the plurality of batches;
    migrating the identified plurality of Vas from its respective source host to a respective destination host according to the migration sequence; and
    selecting the set of identified Vas included in each batch of the plurality of batches which comprises: selecting a first role from amongst the roles performed by the plurality of Vas that is to be started first on a destination host during the migrating of the identified plurality of Vas and including at least one of the identified Vas that performs the first role in a first batch of the migration sequence.

17. A system configured to migrate virtualized computing instances (VCIs) that implement a logical multi-node application, the system comprising one or more processing units executing sets of instructions for:
    identifying a plurality of Vas that implement a logical multi-node application, each of the plurality of Vas being executed on a respective source host;
    identifying a role, associated with one or more functionalities of the logical multi-node application, performed by each VCI of the identified plurality of VC's;
    generating a plurality of batches, each batch of the plurality of batches including a set of the identified plurality of Vas selected based on the identified role of each of the VC's;
    generating a migration sequence comprising an ordered sequence of the plurality of batches;
    migrating the identified plurality of Vas from its respective source host to a respective destination host according to the migration sequence; and
    selecting the set of identified Vas included in each batch of the plurality of batches which comprises: selecting a first role from amongst the roles performed by the plurality of Vas that is to be started first on a destination host during the migrating of the identified plurality of Vas and including at least one of the identified Vas that performs the first role in a first batch of the migration sequence.

* * * * *